June 13, 1961 J. HEZLER, JR 2,987,979
ROOF VENTILATOR FOR VEHICLES
Filed Dec. 9, 1957 3 Sheets-Sheet 1
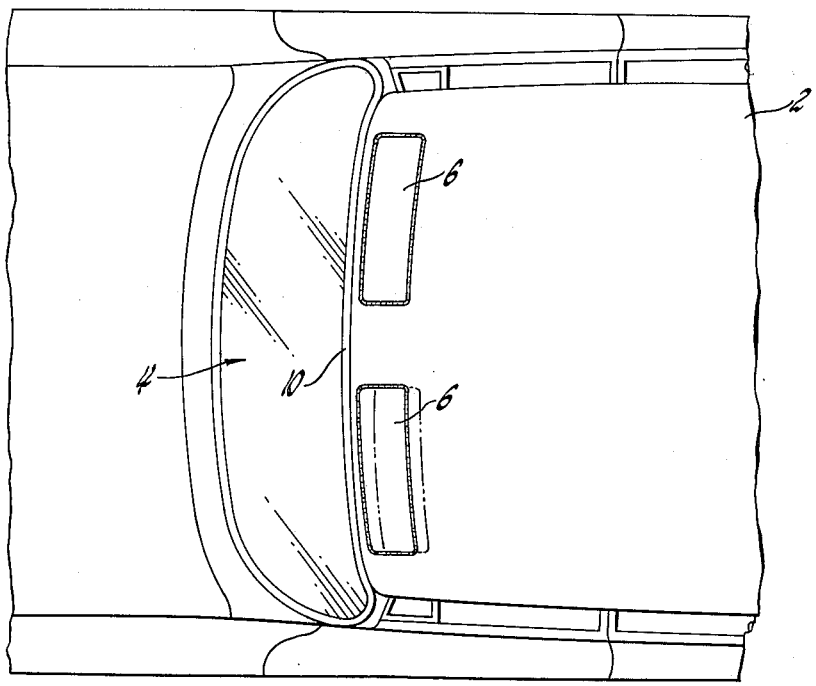
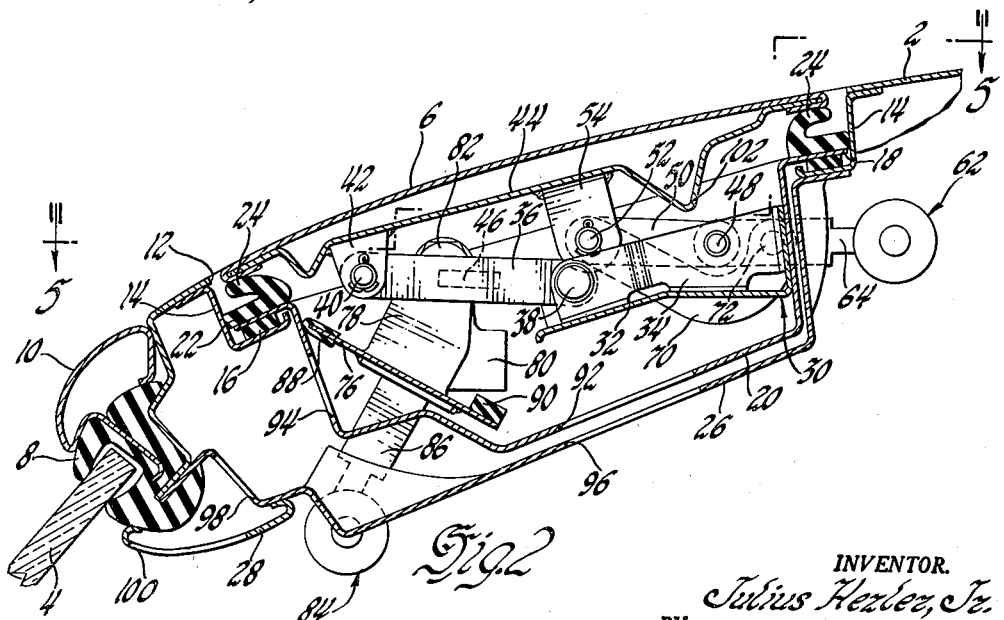
INVENTOR.
Julius Hezler, Jr.
BY
J. W. Lovett
ATTORNEY

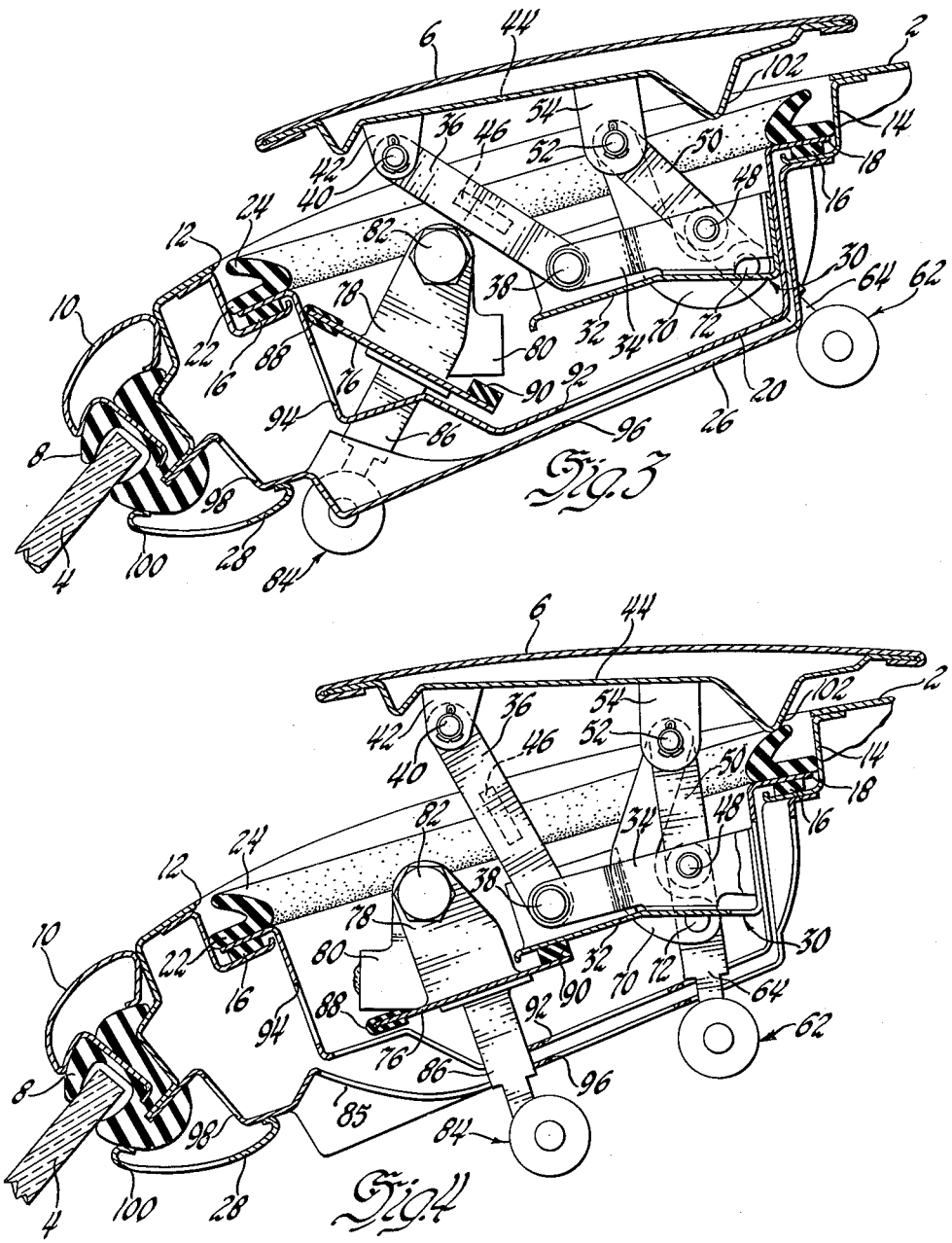

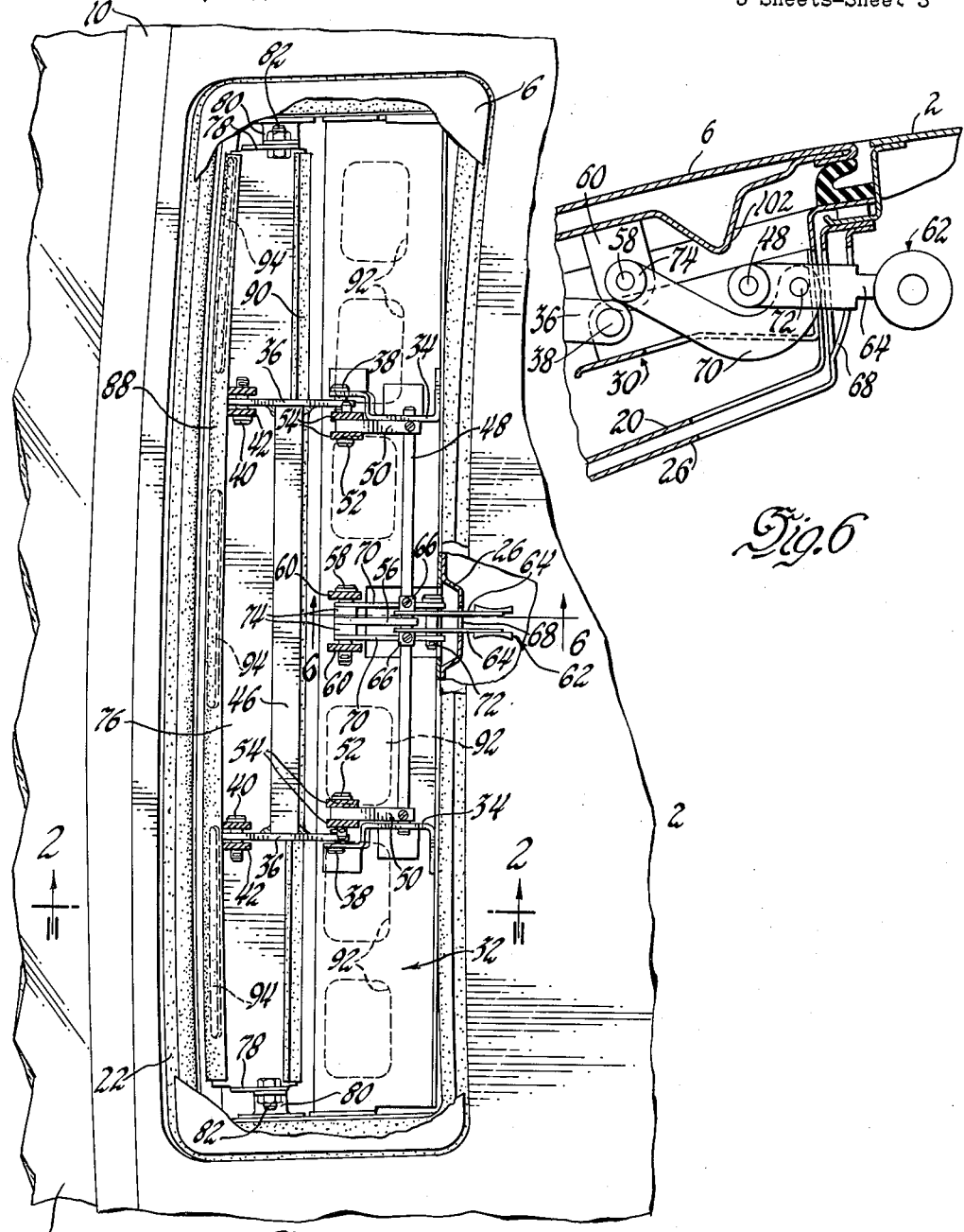

United States Patent Office 2,987,979
Patented June 13, 1961

2,987,979
ROOF VENTILATOR FOR VEHICLES
Julius Hezler, Jr., East Detroit, Mich., assignor to General Motors Corporation, Detroit, Mich., a corporation of Delaware
Filed Dec. 9, 1957, Ser. No. 701,415
4 Claims. (Cl. 98—2)

This invention relates generally to the ventilation of vehicle bodies and more particularly to an improved roof ventilator construction with air flow control means to provide for the circulation of air into or out of the vehicle body.

One object of the invention is to provide a roof ventilator for a vehicle body having a ventilating opening therein in which the closure or cover for the opening is adapted to be moved into one position to exhaust air from the body and into a second position to deflect outside air into the body.

A further object is to provide a ventilator construction having an adjustable baffle plate adapted to direct the incoming outside air either toward the vehicle windshield or directly into the vehicle to the rear of the windshield.

Other objects of the invention will be apparent from the description of the embodiment shown in the accompanying drawings in which like numerals are used to designate corresponding parts in the several views.

FIG. 1 is a fragmentary plan view of the front portion of a vehicle body showing two ventilators mounted in the roof of the vehicle.

FIG. 2 is a fragmentary sectional view taken substantially on line 2—2 of FIG. 5 showing the ventilator cover in its closed position.

FIG. 3 is a view similar to FIG. 2 showing the ventilator cover in its exhaust position.

FIG. 4 is a view generally similar to FIG. 2 showing the ventilator cover in another position.

FIG. 5 is a fragmentary plan view taken substantially on line 5—5 of FIG. 2 with parts broken away.

FIG. 6 is a sectional view taken on lines 6—6 of FIG. 5.

Referring now to the drawings, the vehicle is only partially shown as including the usual roof 2 and windshield 4. As indicated in FIG. 1 a pair of spaced ventilators having corners 6 are located in the roof 2 in close proximity to the windshield 4 which is mounted by means of the rubber sealing strip 8 with an ornamental garnish molding 10. Although a pair of ventilators are shown in FIG. 1 it will be understood that only a single ventilator may be provided if desired.

Proceeding now to the description of the ventilator construction, the roof 2 is provided with a ventilating opening 12 which may be rectangular and slightly larger than the cover 6. A gutter 14 is secured to the roof 2 around the marginal edges of the opening 12 to provide a seat for a rubber strip 16 on which is supported an outwardly extending flange 18 around the upper edge of a depending sheet metal member 20.

A rubber sealing strip 22 is mounted within the ventilating opening 12 on the flange 18 and formed with a projecting lip portion 24 to resiliently engage the underside of the ventilator cover 6 when the cover is in its closed position. An inner panel 26 is secured to the lower side of the gutter 14 with the front portion of this panel extending to and secured within the rubber strip 8 adjacent the windshield. A garnish molding 28 may also be provided, if desired, between the front portion of the panel 26 and the rubber strip 28 to enhance the appearance of the ventilator.

The ventilator cover 6 is supported on a main bracket 30 secured to the member 20 and provided with a substantially horizontal wall portion 32 which extends transversely between the end walls of the member 20 and forwardly within the member 20. Spaced mounting brackets 34 are secured to the main bracket 30 and links 36 are pivotally connected at one of their ends to the forward ends of these brackets at 38 and pivotally connected at their other ends by pivots 40 to ears 42 secured to an inner wall 44 of the cover 6. The links 36 are preferably connected together between their ends by a rigid equalizing or reinforcing bar 46.

As shown in FIG. 5, a transversely extending shaft 48 is supported at its ends in the spaced brackets 34, and a link 50 is provided adjacent each bracket 34 with one end of each link mounted on shaft 48 and the other end pivotally connected by a pivot shaft 52 to ears 54 secured to the inner wall 44 of the cover 6. A further intermediate link 56 is provided to pivotally connect the cover 6 to the shaft 48. This link 56 is mounted at one end on the shaft 48 with its other end mounted on a shaft 58 extending between spaced ears 60 secured to the inner wall 44 of cover 6.

An operating handle indicated generally at 62 is provided to move the ventilator cover into the different positions shown in the drawings as will be described hereinafter. This handle 62 is shown in FIG. 5 as consisting of spaced parallel arms 64 with one end of each arm mounted on the shaft 48 between the link 56 and a collar 66. The arms 64 extend through openings in the main bracket 30 and member 20 and outwardly through a guide slot 68 in the inner panel 26. These arms may be made of spring metal with the outer ends biased apart to frictionally engage the sides of the guide slot 68 which may be formed with notches (not shown) to receive these ends to retain the handle in the different positions to which it may be manually moved. The arms 64 of the operating handle are shown in FIG. 6 to be connected to the cover 6 by parallel levers 70 which are mounted at one end on a shaft 72 extending through the arms 64. The other ends of levers 70 are mounted on the shaft 58 with spacers 74 between the levers and the end of the intermediate link 56 on shaft 58. The link 56 is of the same general configuration as the links 50 and, in addition, the connections to the shafts 48 and 58 are in axial alignment with the pivotal connections of the links 50 so as to provide the identical movements during the operation of the operating handle 62.

A transversely extending baffle plate 76 is pivotally mounted within the member 20 adjacent the forward portion thereof. As shown in FIGS. 2 and 5, the ends of plate 76 are provided with upwardly extending flanges 78 which are pivotally connected to brackets 80 by pivot bolts 82. As best shown in FIG. 4, an operating handle 84 which may be constructed with spaced parallel spring arms 86 is secured to the lower side of the plate 76 intermediate the ends of the plate and this handle 84 extends outwardly through a guide slot 85 in an arcuate offset wall portion of the panel 26 in a manner similar to the operating handle 62. The front edge of the baffle plate 76 is provided with a rubber sealing strip 88 which is adapted to engage the forward wall of member 20 in one position of the baffle plate and a rubber strip 90 is mounted on the rear edge of plate 76 to engage the wall portion 32 of the main bracket 30 in another position of the baffle plate as will be hereinafter described.

As shown in dotted lines in FIG. 5, the bottom wall of the member 20 is provided with transversely spaced openings 92 and the forward wall of member 20 is provided with transversely spaced openings 94. The inner panel 26 is provided, as shown in FIG. 2, with bottom openings 96 in alignment with the openings 92 and panel 26 is also provided with openings 98 adjacent the front portion thereof in alignment with openings 100 in the garnish molding 28.

Referring now to FIGS. 2 to 4 which show the several positions to which the ventilator cover 6 and baffle plate 76 may be moved by the operating handles 62 and 84, the parts of the construction described above are first shown in FIG. 2 with the cover 6 in engagement with the flexible lip portion 24 of the rubber strip 22 to close and seal the ventilating opening 12 in the roof.

If it is desired to exhaust air from the vehicle body the operating handle 62 is moved clockwise to the position shown in FIG. 3. During this movement of handle 62 the levers 70 will force the ventilator cover 6 upwardly and the pivotal link connections of the cover to main bracket 30 will cause the cover to move upwardly and slightly rearwardly in spaced relation to the ventilating opening 12. In this position of the cover 6 the outside air during movement of the vehicle passes under the cover and the air velocity produces a low pressure zone adjacent the ventilating opening which serves to draw the air from the vehicle body through the openings 92 and 96.

If it is desired to deflect the outside air into the vehicle body the operating handle 62 is moved clockwise to the position shown in FIG. 4. During this further movement of the handle 62 the pivotal link connections of the cover 6 to main bracket 30 will cause the cover to move rearwardly and since the links 36 adjacent the front of the cover are longer than the links 50 and 56 the front of the cover will move upwardly to tilt the cover to the position shown in which a rib 102, which extends downwardly on the inner wall 44 of cover 6 and is substantially parallel to the rear edge thereof will engage the flexible lip portion 24 of the rubber strip 22 along the rear edge of the ventilating opening 12.

The outside air which is deflected into the vehicle body when the cover 6 is in the position shown in FIG. 4 may be directed, as desired, either forwardly onto the windshield 2 or into the body to the rear of the windshield by manual operation of the baffle plate 76. When the baffle plate is in the position shown in FIG. 4, it closes the space between the member 20 and the wall portion 32 of bracket 30 so that the incoming air will enter the body through the openings 94, 98 and 100 and be thereby directed forwardly onto the windshield 2. If, however, the operating handle 84 is moved from the position shown in FIG. 4 to the position shown in FIG. 3, the baffle plate 76 will engage the forward wall of member 20 to close off the openings 94 and the incoming air will then enter the vehicle body through the openings 92 and 96 in the bottom walls of member 20 and panel 26.

It will be understood that the present invention is not limited to the specific embodiment shown herein and modifications of this construction and various other arrangements will be obvious to those skilled in the art and are contemplated as within the scope of this invention.

I claim:

1. In a ventilator for a vehicle body having a windshield and a ventilating opening in the roof in close proximity to the upper edge of the windshield, a movable cover for said opening, first means for supporting said cover for movement to an open position in which said cover closes said opening adjacent the rear edge thereof to deflect outside air into the vehicle body, and second means in said body adjacent said opening to selectively direct the outside air downwardly towards said windshield or into the body to the rear of said windshield, said second means including a chamber having an outlet opening adjacent the front portion thereof and further outlet opening to the rear of said front portion, said second means further comprising a manually operable baffle plate in said chamber, and third means for mounting said baffle plate for movement to selective positions in which it prevents passage of air through either outlet opening.

2. The device as set forth in claim 1 wherein said movable cover includes a downwardly extending rib spaced from and substantially parallel to the rear of said cover and adapted to close said ventilating opening adjacent the rear edge thereof to deflect outside air into said vehicle body.

3. The device as set forth in claim 1 wherein the first means includes a bracket and bracket support located below said opening, and link members connecting said cover to said bracket and adapted to support said cover between open and closed positions.

4. The device as set forth in claim 3 wherein said link members comprise a first link pivotally connecting the forward portion of said cover to said bracket, a second link pivotally connecting a portion intermediate the forward and rear edges of said cover to said bracket, and actuating means connected to said intermediate portion and to said bracket.

References Cited in the file of this patent

UNITED STATES PATENTS

| | | |
|---|---|---|
| 1,654,715 | Affleck et al. | Jan. 3, 1928 |
| 1,969,935 | Lintern et al. | Aug. 14, 1934 |
| 2,049,701 | Guyot | Aug. 4, 1936 |
| 2,159,516 | Ball | May 23, 1939 |
| 2,337,632 | Winser | Dec. 28, 1943 |
| 2,443,454 | Hennessy | June 15, 1948 |
| 2,514,772 | Kramer | July 11, 1950 |
| 2,810,334 | Perks | Oct. 22, 1957 |
| 2,853,934 | Hohmann | Sept. 30, 1958 |

FOREIGN PATENTS

| | | |
|---|---|---|
| 558,042 | Germany | Aug. 31, 1932 |